US009983926B2

(12) United States Patent
Busch

(10) Patent No.: US 9,983,926 B2
(45) Date of Patent: May 29, 2018

(54) APPARATUS, SYSTEM AND METHOD FOR PROTECTING DATA

(71) Applicant: Infineon Technologies AG, Neubiberg (DE)

(72) Inventor: Holger Busch, Brunnthal-Otterloh (DE)

(73) Assignee: Infineon Technologies AG, Neubiberg (DE)

( * ) Notice: Subject to any disclaimer, the term of this patent is extended or adjusted under 35 U.S.C. 154(b) by 70 days.

(21) Appl. No.: 14/874,773

(22) Filed: Oct. 5, 2015

(65) Prior Publication Data

US 2016/0110241 A1    Apr. 21, 2016

(30) Foreign Application Priority Data

Oct. 21, 2014   (DE) .................. 10 2014 015 585

(51) Int. Cl.
    *G11C 29/00*    (2006.01)
    *G06F 11/10*    (2006.01)

(52) U.S. Cl.
    CPC ............................. *G06F 11/1012* (2013.01)

(58) Field of Classification Search
    CPC .. G06F 11/14; G06F 11/1044; G06F 11/0757; G06F 11/0727; G06F 11/1016; H03M 13/29; H03M 13/095; G11C 8/00
    See application file for complete search history.

(56) References Cited

U.S. PATENT DOCUMENTS

| 4,271,519 A * | 6/1981 | Hall .................. G11C 8/00 714/771 |
| 2004/0117723 A1* | 6/2004 | Foss .................. G06F 11/1044 714/805 |
| 2011/0185268 A1* | 7/2011 | Matsushige ......... G06F 11/0757 714/819 |

* cited by examiner

*Primary Examiner* — Guerrier Merant
(74) *Attorney, Agent, or Firm* — Eschweiler & Potashnik, LLC

(57) ABSTRACT

An apparatus and corresponding method for protecting stored data. The apparatus includes a first encoder, a memory, a second encoder and a comparator. The first encoder is configured to generate first redundancy bits using a protection method to protect input data bits, whereas the input data bits are assigned to at least one of a plurality of classes. The memory is configured to store selectively inverted input data bits and/or selectively inverted first redundancy bits, whereas the selective inversion is based on the assigned at least one of the plurality of classes. The second encoder is configured to generate second redundancy bits using the protection method by encoding the selectively inverted input data bits. The comparator is configured to generate an alarm signal if the second redundancy bits are different from the first redundancy bits.

17 Claims, 5 Drawing Sheets

US 9,983,926 B2

APPARATUS, SYSTEM AND METHOD FOR PROTECTING DATA

CROSS REFERENCE TO RELATED APPLICATIONS

This application claims priority to German Patent Application number 102014015585.4 filed Oct. 21, 2014, which is entitled "Apparatus, System and Method for Protecting Data" and is hereby incorporated by reference in its entirety.

FIELD

The present disclosure relates to safety mechanisms for protecting data to be stored in a memory, e.g. in a register, in particular to fulfill safety requirements for example in automotive applications by using a device, such as a microcontroller.

SUMMARY

A first embodiment relates to a method for protecting input data bits. The method comprises the assignment of input data bits to at least one of a plurality of classes. Based on the input data bits and the assigned class or classes, first redundancy bits are calculated. Afterwards, the method furthermore comprises the generation of memory bits by a selective inverting of the read input data bits and/or the calculated first redundancy bits. The selective inverting is also based on the assigned at least one of the plurality of classes. Based on the payload of the memory, second redundancy bits are then calculated. If the second redundancy bits and the first redundancy bits are different, an alarm signal is generated.

A second embodiment relates to a wrapper for protecting data. The wrapper comprises a first encoder which is configured to generate first redundancy bits by using a protection method to protect the read input data bits, whereas the input data bits are assigned to at least one of a plurality of classes. Additionally, the wrapper comprises a memory, which is configured to store selectively inverted input data bits and/or selectively inverted first redundancy bits. The selective inversion is based on the assigned at least one of the plurality of classes. Furthermore, the wrapper comprises a second encoder which is configured to generate second redundancy bits using the protection method by encoding the selectively inverted input data bits. If the second redundancy bits are different from the first redundancy bits, an alarm signal is generated by a comparator.

A third embodiment relates to a system which comprises a wrapper and a test controller. The test controller is configured to provide a control signal to the wrapper and to receive an alarm signal.

A fourth embodiment relates to a system which comprises a plurality of wrappers and a test controller. The test controller is configured to receive a reduced alarm signal and the reduced alarm signal is configured to indicate correctable errors and uncorrectable errors.

BRIEF DESCRIPTIONS OF THE DRAWINGS

DETAILED DESCRIPTION

In the following description, a plurality of details are set forth to provide a more thorough explanation of embodiments. However, it will be apparent to those skilled in the art that embodiments may be practiced without these specific details. In other instances, well-known structures and devices are shown in block diagram form rather than in detail in order to avoid obscuring embodiments. In addition, features of the different embodiments described hereinafter may be combined with each other, unless specifically noted otherwise.

Automotive Safety Integrity Level (ASIL) is a risk classification scheme defined by the ISO 26262—Functional Safety for Road Vehicles standard, which is an adaptation of the Safety Integrity Level used in IEC 61508 for the automotive industry. The ASIL is established by performing a risk analysis of a potential hazard by looking at the severity, exposure and controllability of the vehicle operating scenario. There are four ASILs identified by the standard: ASIL A, ASIL B, ASIL C, ASIL D. ASIL D dictates the highest integrity requirements on the product and ASIL A the lowest.

The present disclosure is directed to a wrapper, a system comprising a wrapper and a test controller and systems comprising several wrappers. Additionally, a method for generating alarm signals is disclosed. The wrapper may enclose a memory, e.g. a register, to store data to be used in applications that are sensitive to safety requirements. The safety standard ISO26262 requires safety-critical parts of automotive microcontroller components to be safeguarded against spontaneous soft-errors.

However, there is a trade-off between circuit robustness and extra redundancy added to hardware which results in area and power consumption hardly acceptable by customers. Thus a flexible solution is needed which allows safeguarding measures to be tailored to varying customer and safety requirements according to their required ASIL levels. The soundness of all extra hardware safety measures must be guaranteed, i.e. the regular function must not be affected. The safeguarding approach should be parametric and safely adaptable with minimum effort.

The U.S. patent application U.S. 2013061094A1 shows a module with a safety register where the safety is achieved by using dual or triple module redundancy. However, this approach would result in a permanent increase of costly silicon area, particularly for register bits that do not need to be safe.

The problem is to provide a flexible solution for register protection. This disclosure provides register protection and preserves register testability during regular operation and support of arbitrarily configurable register widths. The disclosed register safety wrapper may provide alarm signals and test alarm signals which indicate stuck-at faults or broken alarm logic.

Figure 1:
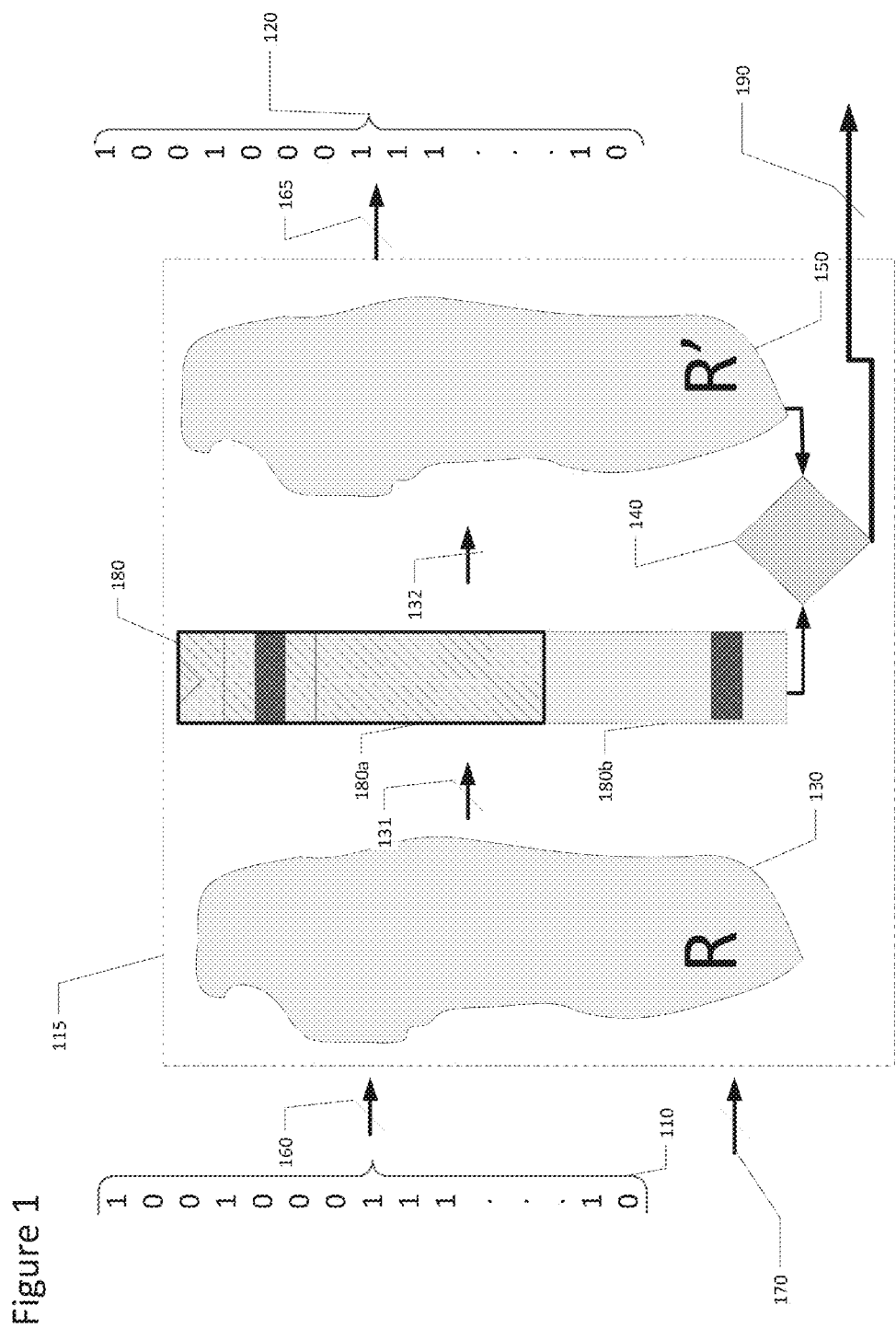
FIG. 1 shows a schematic diagram illustrating an apparatus for protecting data according to one of a number of embodiments.

FIG. 1 shows a schematic diagram illustrating an apparatus 115 for protecting, testing and storing data bits. The apparatus or wrapper 115 may be able to read input data bits 110 via an input data port 160 and input control signals 170. The wrapper 115 provides output data bits 120 via an output data port 165 and an output control signal 190. The output data bits 120 may be identical to the input data bits 110. The read input data bits 110 may be modified through logic operations and stored by a memory or memory element, e.g. an internal register 180, which may be realized by one or more clocked flip flops (FFs). In basic operation mode the clocked FFs may provide their corresponding input to the associated output of the FFs after one clock cycle. Alternatively, bits of the input data port 160 may be connected to the output data port 165 of the wrapper 115 by combinatorial logic, i.e. without any register storage.

The output control signal 190 may be input to a not shown test-controller or any other controller. The output signals may be aligned with a not shown clock signal. In a basic operation mode the wrapper 115 may implement a regular register functionality. However, in addition to the basic operation mode the wrapper may provide protection and test capabilities.

The wrapper 115 comprises a first encoder 130, storage element 180, e.g. a register, and a second encoder 150. The first encoder 130 receives the input data bits 110 via an input data port 160 and provides via its output port 131 payload bits 180a and a certain number of first redundancy bits R. The payload bits 180a may be identical to the input data bits 110. According to some embodiments the payload bits 180a may be reordered input data bits 110. The number of first redundancy bits R depends on a protection method used by the first encoder 130. Input data bits 110 are stored as payload bits 180a and first redundancy bits R may be stored as encoded bits 180b in register 180.

The first encoder 130 generates first redundancy bits R according to a bitwise predefined protection method. The protection method protects selected input data bits 110 according to a safety requirement level which may be assigned to input data bits 110. Accordingly, a selection of input data bits 110 will either be protected or non-protected.

The bitwise predefined protection method may consist of DMR-protection (Double Modular Redundancy), TMR-protection (Triple Modular Redundancy), ECC-protection (Error Correction Codes), parity-bit generation or other methods or a combination thereof.

For DMR-protection, the first redundancy bits R are a replication of the original input data bits. Thus, if the number of input data bits which are used for DMR is N, the number of associated encoded bits is 2N.

For TMR-protection, the first redundancy bits R are two replications of the original input data bits. Thus, if the number of input data bits which are used for TMR is N, the number of associated encoded bits is 3N.

For ECC-protection (Error Correction Codes), the number of first redundancy bits R depends on the specific code selected and is determined by a corresponding function. The ratio between generated first redundancy bits R and payload bits 180a decreases with bigger widths of the input vector, i.e. with an increasing number of input data bits 110. In one example the ratio may be 5/8, i.e. 5 redundant additional redundant bits for 8 input data bits (or payload bits). However, in another example the ratio may be 10/320 or even 15/10000 with double bit error detection and single bit error correction.

In order to support ECC protection for arbitrary data widths, a Hsiao matrix may be generated dynamically. Such a matrix can e.g. be constructed in a straightforward way such that a hamming distance of 2 is guaranteed by construction. Any more advanced algorithm for generating optimal ECC code for minimized multiplexer logic can be alternatively applied. There are further ECC versions with and without error correction which may be implemented in first encoder 130. Examples are SECDED (single error correction, double error detection), DED (single and double bit error detection, no correction), DECTED (double bit error correction, triple bit error detection) and others.

In another example simple Parity-Bit generation is supported. In this case only one bit of redundancy is generated by first encoder 130. This bit may be set to 1 if the input data bits 110 have an odd number of 1s. Thus any odd number of errors will be detected, while any even number of errors will erroneously be classified as no error. However, the function of first encoder 130 is not limited to the explicitly mentioned protection methods. Any other method could be integrated which adds first redundancy bits R to input data bits 110.

In another example the first encoder 130 may apply a combination of different encoding methods like DMR, TMR and ECC protection to different portions of the input data bits 110.

In addition to calculate first redundancy bits R, the encoder may be able to support test functionality. For this the encoder 130 may flip or invert certain bits of the first redundancy bits R and/or input data bits 110 (as payload bits 180a) before they are stored in register 180. The register 180 therefore stores either the non-inverted or inverted bits. The selective inversion of bits is used to produce defined errors in stored data. The selection which of the bits stored in register 180 should be inverted may be controlled by control signals 170.

The criteria which bits should be inverted may also be determined by different safety level requirements. This means the input data bits 110 will either be testable or non-testable. If they are testable, they could be inverted and thus an error could be produced.

To protect and/or test the input data bits 110, five different classes may be assigned to the input data bits. These classes may represent five different safety requirement levels, e.g. combinatorial, unprotected, protected-fully-testable, protected-reduced-testable and non-testable classes.

The wrapper 115 further comprises a second encoder 150 which reads the bits stored in register 180 and provides output data 120 at output data port 165, a control signal 190 and second redundancy bits R'. Because of the test functionality of the first encoder 130, i.e. the selective inversion of certain bits, the second encoder may be able to re-invert the bits before the calculation of second redundancy bits R' is started. The encoding algorithm of second encoder 150 implements the same protection method as first encoder 130.

The wrapper further comprises a comparator 140 configured to generate an alarm signal 190 if the second redundancy bits R' are different from the first redundancy bits R. Because of the selective inversion of bits stored in register 180, an alarm signal 190 may be generated intentionally for test purposes.

The wrapper 115 may be configured by using input control signals 170. The settings of the encoder 130 may for example be controlled by a not shown microcontroller, which is connected to input control signals 170. These settings may include further information of the input data bits 110 and the encoding capabilities of the encoder 130.

The input data bits 110 may be split into groups of bits or bit-slices, e.g. a bit-slice may comprise 7 bits or 3 bits and another bit-slice may comprise 2 bits. It is noted that a bit-slice may only comprise one bit or, in another example, may comprise 32, 64 or 128 bits. As the number of input data bits 110 is flexible, the number and size of bit-slices is flexible and not limited to powers of 2. The bit-slices may have been assigned to one of a group of different safety requirement levels or respective classes. In one example a bit-slice may be assigned to class "protected-non-testable" while another bit-slice is assigned to class "protected-fully-testable".

A bit-slice of input data bits 110 that is mapped to class "combinatorial" may actually not be stored in register 180, but may directly be provided as output signal 120 at output data port 165. For a bit-slice of input data bits 110 that is mapped to class "unprotected" the encoder 130 does not add any redundant bits R to the payload. In this case only the payload bits 180a may be stored in register 180. For the remaining three classes, i.e. "protected-non-testable", "protected-reduced-testable" and "protected-fully-testable", first redundant bits R may be calculated and stored as encoded bits 180b in addition to payload bits 180a and a certain test mode may be implemented by a selective inversion before storing.

For safety requirement levels or classes associated with "fully-testable" the payload 180a as well as the first redundant bits 180b may be used for a self-test. This self-test may be used to generate an alarm signal 190. For safety requirement level or class "reduced-testable", only the first redundant bits 180b may be used for the self-test.

Figure 2:
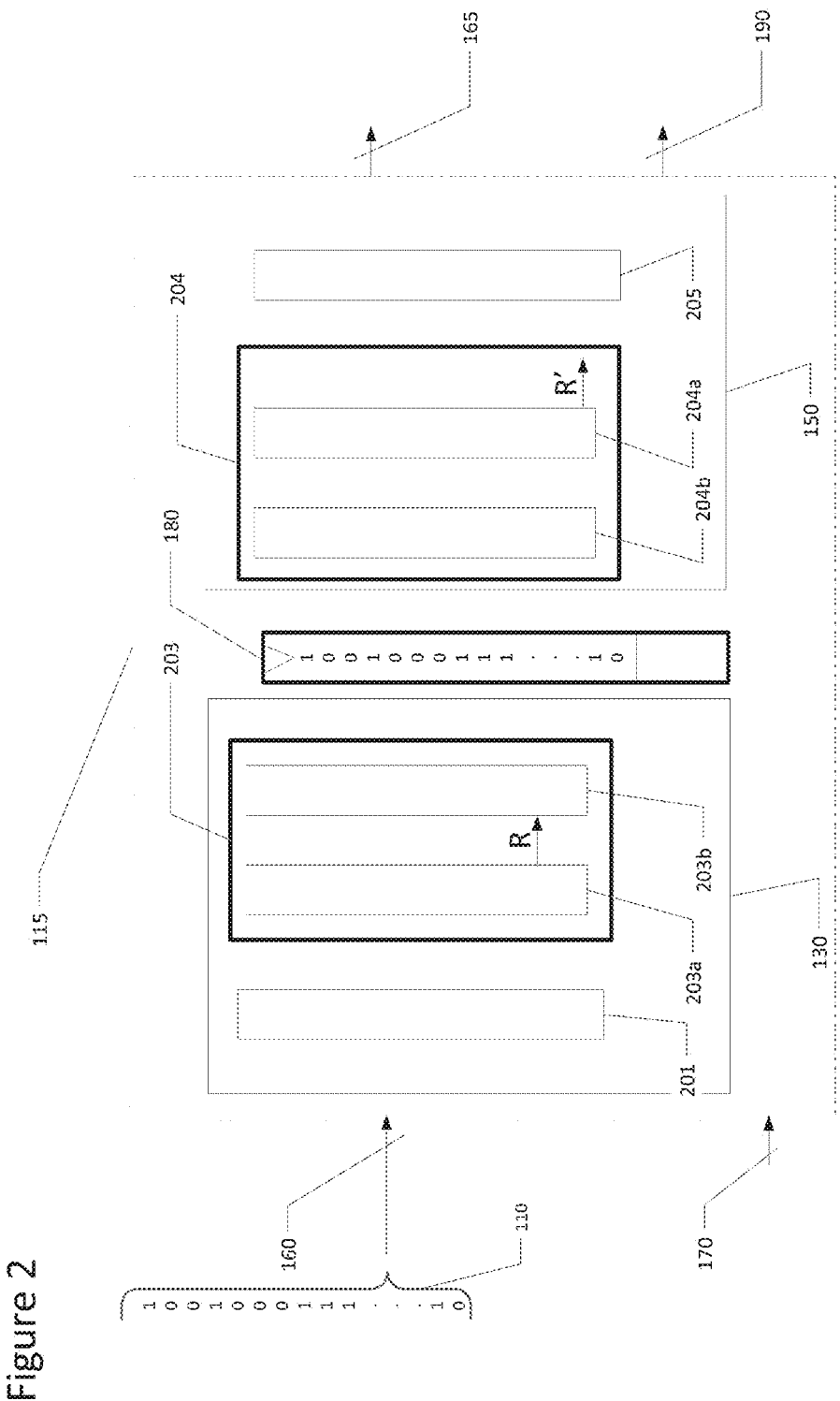
FIG. 2 shows a schematic diagram illustrating an exemplary embodiment of a wrapper.

FIG. 2 shows an embodiment of the wrapper 115 illustrating a general memory safeguarding architecture. The wrapper 115 consists of a first encoder 130, a memory 180 and a second encoder 150. The memory may be a register. The first encoder 130 comprises a sorting module 201 and an encoding submodule 203. The submodule 203 consists of a first stage encoder 203a and a test inverter 203b.

The input data bits 110 of the wrapper 115 may be connected via an input data port 160 to the sorting module 201 which provides reordered input data bits in order to combine all input data bits 110 assigned e.g. to one of the above mentioned five classes (i.e., combinatorial, unprotected, protected-fully-testable, protected-reduced-testable and non-testable) into respective coherent bit-strings. In this way, the actual generation of first redundancy bits R in the encoder may be much simpler.

According to the assignment of input data bits 110 to a protection-test-class (PT-class or safety requirement level), the sorting module 201 may re-order the sequence of the input data bits 110 in such a way that data supposed for full testing is e.g. put to the lowest positions, data for reduced testing (and non-testable bits) to middle positions and data for unprotected bits to the highest positions. The sorting of the input data bits 110 may ease further treatment of bit-slices according to their protection mode.

In one example non-coherent bit-fields [1-5,10-15,27-31] of input data 110 may be ECC-protected. In this case they are first combined to a coherent 16-bit vector before being fed into first stage encoder 203a, which in this case would be an ECC-encoder. The 16-bit output vector of the inverse first stage encoder 204a, which in this case would be an associated ECC-encoder, is then re-ordered in such a way that the final output data bits are exactly in their correct positions [1-5,10-15,27-31]. In order to provide full bit-wise configurability, the ordering component provides the required wiring from the input data bits 110 to the internal logic components including test and encoding logic.

The reordered input data bits are inputs for encoding submodule 203 which consists of a first stage 203a and a test inverter 203b. The first stage 203a generates redundancy bits R according to a defined protection method. The protection level is implemented by a protection method which could be DMR-protection (Double Modular Redundancy), TMR-protection (Triple Modular Redundancy), ECC-protection (Error Correction Codes), parity-bit generation or other methods or a combination thereof.

In one example the first stage 203a may generate a group of 100 bits of reordered input data and a group of 10 bits according to ECC-protection with full self-testing. For another group or bit-slice of 70 reordered input data bits the first stage encoder 203a may generate 8 redundant bits by using ECC protection with reduced self-testing.

The generated redundant bits which are output of the first stage encoder 203a are input to the test inverter 203b. The test inverter 203b may flip these bits according to a defined "polarity". The "polarity" may be a write or toggle polarity. The "write polarity" is applied when a register bit should be overwritten with new input data. A "negative write polarity" will cause the negated data input bit to be written to register 180, i.e. the previous register bit should be overwritten by its negated value. A "positive write polarity" will just keep the bit and write the input data bit to register 180. The "toggle polarity" is applied when no new input data is to be written. By using the test inverter 203b the wrapper 115 is able to produce predefined errors intentionally. These intentionally produced errors allow the generation of an alarm signal 190 and with that a test of the overall function of the wrapper 115 during operation.

The polarities for the inputs of the test inverter 203b may be defined by a test-controller which is not shown in FIG. 2. The not shown test-controller may provide a well-defined sequence of test-phases defined by dedicated polarity information via input control signals 170. The output of test inverter 203b may be stored in register 180. Register 180 may therefore represent a protected version of the input data 110 and may act as a safety register.

The second encoder 150 may implement an inverse function of the first encoder 130 and thus comprises a second encoder submodule 204 and a resorting module 205. The second encoder submodule 204 may therefore comprise an inverse test inverter 204b and an inverse first stage encoder 204a.

The inverse test inverter 204b may get its input data from the safety register 180. These input data may have been either flipped or set to predefined levels by the test inverter 203b. The "read polarities" of the inverse test inverter 204b may therefore correspond to the settings of test inverter 203b. The read polarities allow non-inverted data to be delivered to the fan-out logic, such that the surrounding circuitry does not notice that data bits in the registers have been flipped during self-testing. Thus the self-testing does not affect the regular function and can be carried out at any time.

The output of the inverse test inverter 204b may be fed to the inverse first stage encoder 204a which implements the inverse function of the first stage encoder 203a and the used protection method. The inverse first stage encoder 204a may calculate second redundancy bits R' and may afterwards use R and R' to check for errors. Dependent on the used protection method, the inverse first stage encoder 204a may be able to detect any errors or may even be able to correct errors as well. If, for example, the first four bits stored in register 180 have been protected by a TMR-protection method, a single error could be detected and corrected by a majority decision using the added 8 bits of redundancy. The inverse first stage encoder 204a may generate an alarm signal whenever an error is detected. The alarm signal may be output via the output control signal 190.

The inverse first stage encoder 204a provides data to the resorting module 205. The resorting module 205 may re-order its input data according to the function implemented by the sorting module 201.

The safety wrapper 115 may be able to read a certain number of input data bits 110 via an input data port 160, store them with added variable redundancy and—in case no error occurred or error correction was successful—provide these bits as output data 120 at output data port 165.

Because groups of input data bits 110 or bit-slices may require different levels of protection, the first encoder 130 is able to add redundant bits R in a flexible manner. This means that e.g. with a bitwise granularity, the input data bits 110 can be protected according to bitwise different protection methods. The number input data bits N is transformed into a number of encoded data bits M (M>N), where M depends on the required protection method. The safety register 180 stores the N input data bits (=payload) plus a flexible number of redundant bits.

Figure 3:
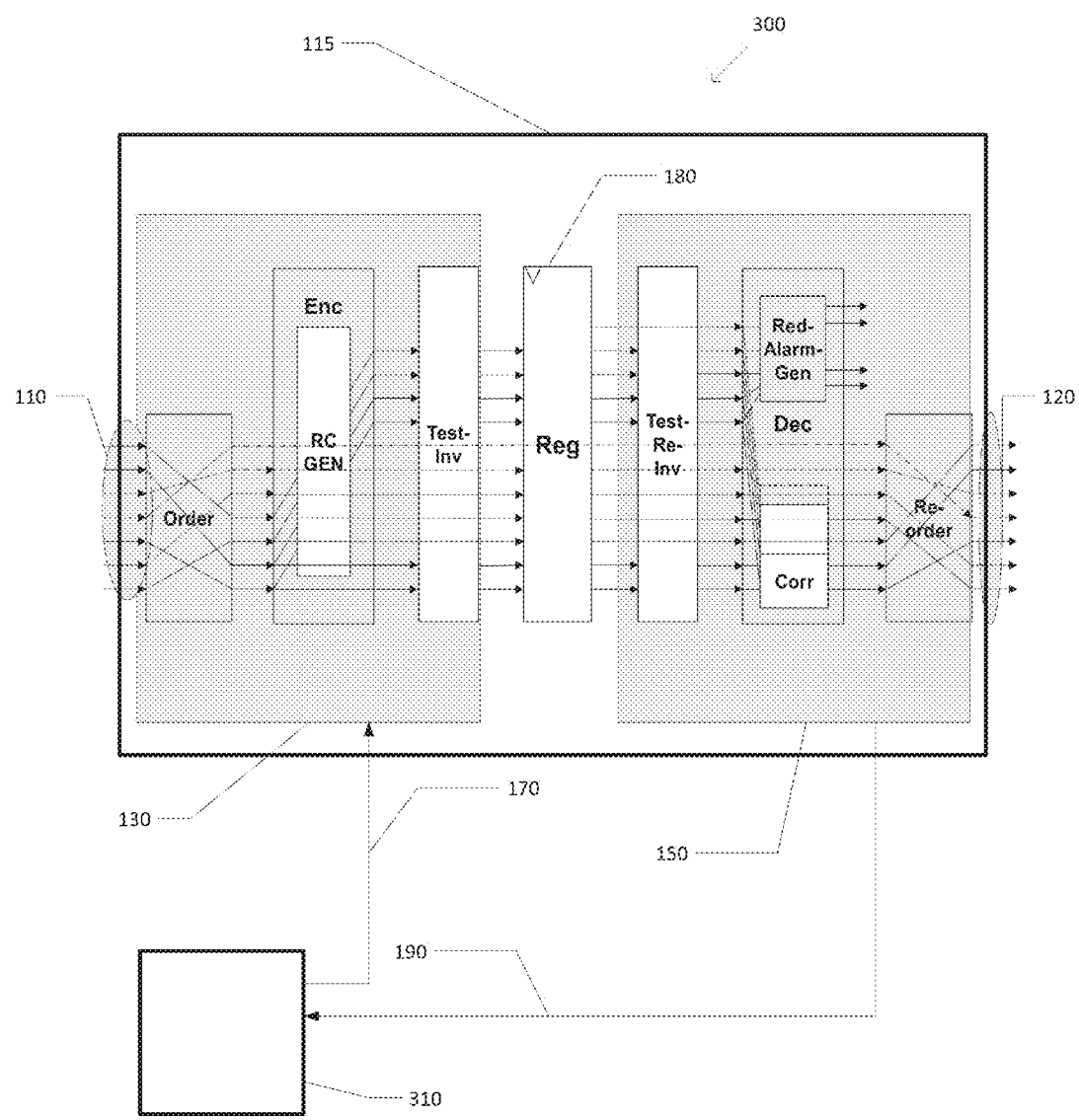
FIG. 3 shows a schematic diagram illustrating an exemplary embodiment of a system which comprises a wrapper and a test controller.

FIG. 3 shows a system 300 which may be used to protect memory 180 (e.g. a register), i.e. to protect a number of input data bits 110 in a flexible manner. The system 300 consists of a wrapper 115 and a controller 310. It is noted that controller 310 may also be used to control more than one wrapper 115. Controller 310 may provide input control signals 170 to the wrapper 115 and particularly to the first encoder 130. Input control signals 170 may be used to define the level of protection for certain input data bit-slices and with that the effort in terms of additional redundancy and computing power. Additionally, the controller 310 may define the classes or test modes for different input data bits-slices described above.

The wrapper 115 generates at least one output control signal 190 that may be read by controller 310. The output control signal 190 may comprise information whether the content of the safety register 180 is corrupted or not. The corruption or an error in the data stored in register 180 may be indicated to controller 310 by alarm signals that are generated by the second encoder 150. In a further example of this embodiment, one wrapper 115 of a not shown plurality of wrappers is excluded from alarm signal generation while other wrappers provide alarm signals.

The write, toggle and read polarities for input data bits 110 or bit-slices and redundant bits may individually be generated by controller 310 as needed in order to trigger alarm signals for test purposes. Depending on the chosen protection method and configurable correction widths (i.e. the number of input data 110), input data bits may be corrected and alarms for correctable or uncorrectable errors are generated in different self-test phases or if real faults occur.

The architecture shown in FIG. 3 may include control signals using "update vectors" which control each individual input data bit whether it should be overwritten in the current cycle with the new value or not. For combinatorial input data bits the corresponding update bits have no relevance. Optionally, the update vector bits may be tied to "1" so that the corresponding input data bits are written unchanged in each cycle.

In a further embodiment the architecture may be modified such that the corrected values of the input data bits are not propagated to output data port 165, but internally fed back to the inputs of the encoder. Instead, the uncorrected values are forwarded to the outputs. In this case a synchronous correction may be performed in the next clock cycle for input data bit positions which are not externally overwritten with new values. A mix between synchronous and asynchronous correction can also be configured, i.e. some bits which e.g. are fed into time-critical logic or other clock domains may be synchronously corrected, less time-critical ones asynchronously.

Figure 4:
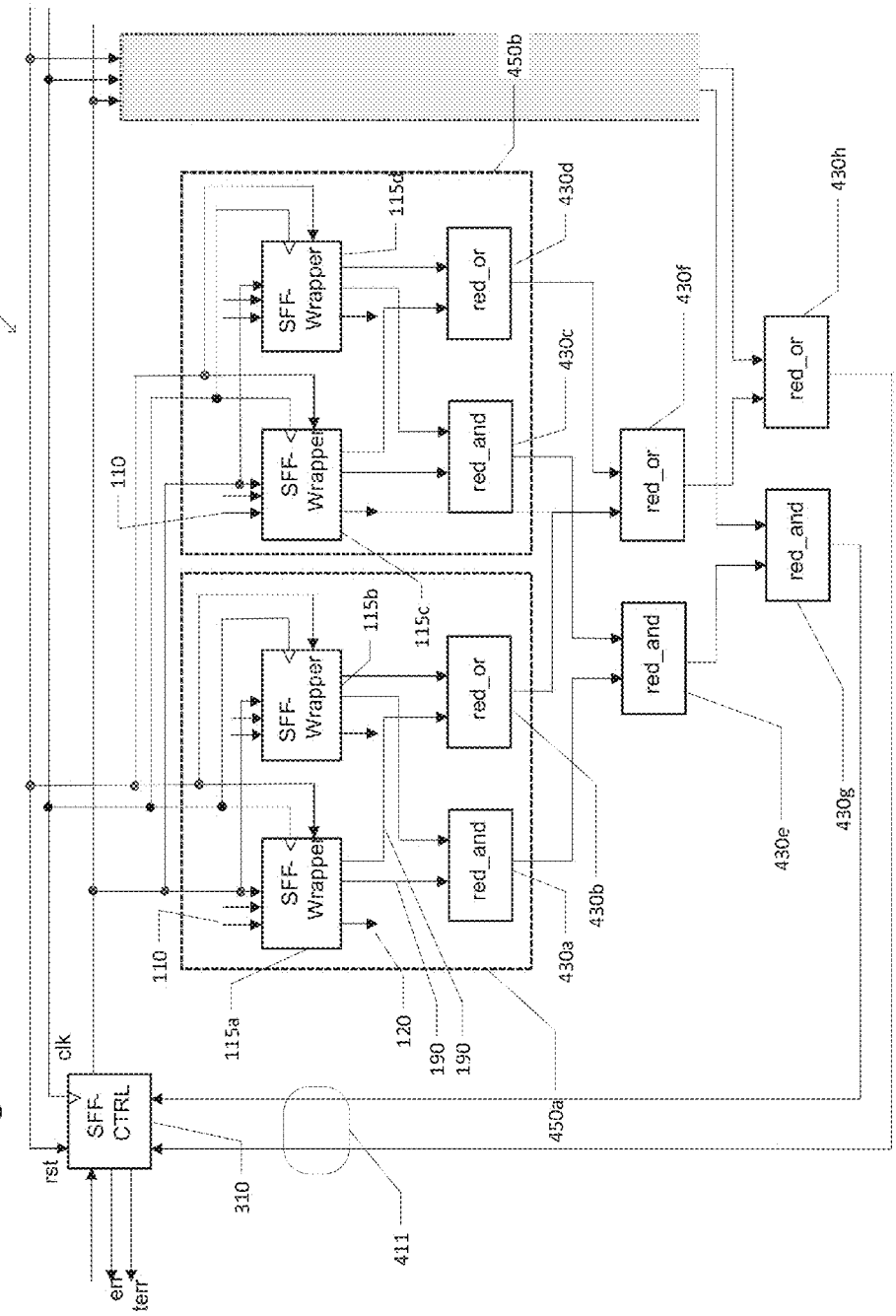
FIG. 4 shows a schematic diagram illustrating an exemplary embodiment of a system whereas the system comprises several wrappers which generate alarm signals which are reduced by using combinatorial logic.

FIG. 4 shows a system 400 which shows a hierarchical architecture consisting of one controller 310 which controls a plurality of wrappers 115a, . . . , 115d. The wrappers (115a, . . . , 115d) may be connected to combinatorial modules (430a, . . . , 430h), which implement a logical OR- or a logical AND-function for its inputs. The combinatorial modules (430a, . . . , 430h) may be used to combine alarm signals 190 generated by the wrappers (115a, . . . , 115d). A combination of alarm signals or a combination of reduced alarm signals (e.g. module 430e reduces the number of reduces alarm signals sent from modules 430a and 430c) allow for a further reduced number of alarm signals 411 sent to the controller 310.

In an example of this embodiment the system 400 comprises two sub-units 450a and 450b whereas each sub-unit consists of two wrappers (e.g. 115a and 115b) and two combinatorial modules (e.g. 430a and 430b) whereas one combinatorial module implements an AND function and the other combinatorial module implements and OR function. The wrappers (115a, . . . , 115d) may provide separate alarm signals for correctable and uncorrectable errors. The AND-reduced alarms may only be set if all input alarms to this combinatorial module are simultaneously set. The OR-reduced alarms are already asserted if at least one input alarm to this combinatorial module is set. As long as no real fault occurs AND- and OR-reduced alarms behave the same.

If any bit is spontaneously flipped while all other alarms are not asserted, the OR-reduced alarm will be asserted, but the AND-reduced alarm will not be asserted. If during testing an alarm is expected and a bit is flipped so that it causes the corresponding local alarm signal not to be set, the OR-reduced alarm would also be set as expected, whereas the AND-reduced alarm won't.

In a further embodiment the system comprises a plurality of wrapper for protecting registers and a nestable plurality of devices for OR-reducing a plurality of received OR-reduced alarm signals. Additionally, the system comprises a nestable plurality of devices for AND-reducing a plurality of received AND-reduced alarm signals and a device which is configured to receive an OR-reduced alarm signal and an AND-reduced alarm signal and to generate a test-alarm if OR-reduced alarm and AND-reduced alarm differ. For protection methods with correction (e.g. TMR, SECDED), separate alarms for correctable and uncorrectable errors may be provided.

In a further embodiment additional logic may take a second input vector specifying which positions of register 180 are to be modified in the current clock cycle. By this, power-saving may be achieved, since register bits which are not going to be updated can be clock-gated. In case of synchronous correction, the corresponding correction positions may be ORed with the external update positions.

In a further embodiment dynamic exclusion of individual wrappers from the complete protection system may be allowed. For currently excluded wrappers, their actual alarms may be replaced by the alarms expected according to the current central controller test-phase. Thus these wrappers are neutralized. The purpose of this dynamic exclusion feature may be to avoid false alarms related to irrelevant data for currently not used or uninitialized registers and to save power during self-testing or to avoid power peaks by simultaneously testing only sub-groups of all registers instead of all ones.

The usage of combinatorial modules defined by OR or AND functions reduce the number of alarm signals generated by the wrappers. Therefore system 400 is an embodiment illustrating how to reduce the number of signals 411 connected to the controller 310.

Figure 5:
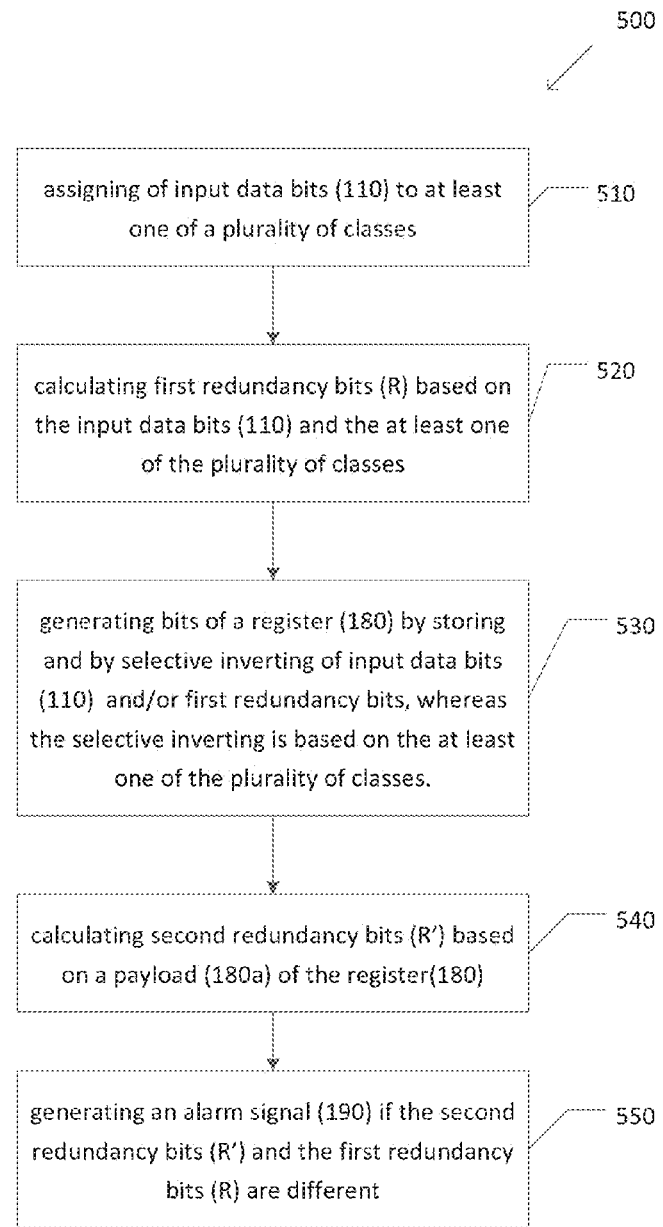
FIG. 5 shows a flowchart illustrating a method for protecting a register.

FIG. 5 illustrates acts to implement a method for protecting registers. In a first act 510 of this method a certain number of input data bits is being assigned to at least one of a plurality of classes. In a second act 520 first redundancy bits R are calculated in accordance with the classes. The classes may represent the five PT (protection/testability)-categories. The categories may be "combinatorial", "unprotected", "non-testable protected", "reduced-testable protected" or "fully-testable protected".

In third act 530 bits of a register 180 are generated by storing and by selective inverting of input data bits and/or first redundancy bits, whereas the selective inverting is based on the at least one of the plurality of classes.

At act 540 second redundancy bits R' are calculated based on a payload 180a of the register 180 before in act 550 an alarm signal 190 is generated if the second redundancy bits R' and the first redundancy bits R are different.

The invention claimed is:

1. A method for protecting input data bits comprising:
   assigning of input data bits to at least one of a plurality of classes,
   calculating first redundancy bits (R) based on the input data bits and the at least one of the plurality of classes,
   generating bits of a memory by storing and by selective inverting of input data bits and/or first redundancy bits, whereas the selective inverting is based on the at least one of the plurality of classes,
   calculating second redundancy bits (R') based on a payload of the memory and
   generating an alarm signal if the second redundancy bits (R') and the first redundancy bits (R) are different.

2. The method according to claim 1, wherein the memory is a register.

3. The method according to claim 1, wherein at least one bit of the input data bits is assigned to a first class of the plurality of classes and at least one other bit of the input data bits is assigned to a second class of the plurality of classes.

4. The method according to claim 1, wherein the plurality of classes represent different safety requirements.

5. The method according to claim 1, wherein the first redundancy bits (R) and the second redundancy bits (R') are calculated by using one out of a group of the following protection methods: DMR, TMR, detectable ECC, correctable ECC or parity generation.

6. The method according to claim 1, wherein the first redundancy bits (R) and the second redundancy bits (R') are calculated by each using a combination of at least two different protection methods out of a following group of protection methods: DMR, TMR detectable ECC, correctable ECC or parity generation.

7. The method according to claim 1, wherein the selective inverting is controlled by control signals.

8. The method according to claim 1, wherein the plurality of classes comprise combinatorial, unprotected, protected-fully-testable, protected-reduced-testable and non-testable classes.

9. The method according to claim 8, wherein for the protected-reduced-testable class only the payload is selectively inverted and whereas for the protected-fully-testable class all bits of memory are selectively inverted.

10. The method according to claim 1, wherein the order of input data bits is modified according to the assigned at least one of the plurality of classes before the first redundancy bits (R) are calculated.

11. An apparatus for protecting data, comprising:
    a first encoder configured to generate first redundancy bits (R) using a protection method to protect input data bits, whereas the input data bits are assigned to at least one of a plurality of classes,
    a memory configured to store selectively inverted input data bits and/or selectively inverted first redundancy bits, whereas the selective inversion is based on the assigned at least one of the plurality of classes,
    a second encoder configured to generate second redundancy bits (R') using the protection method by encoding the selectively inverted input data bits and
    a comparator configured to generate an alarm signal if the second redundancy bits (R') are different from the first redundancy bits (R).

12. The apparatus of claim 11, wherein the protection method is one of the following: Double Modular Redundancy (DMR), Triple Modular Redundancy (TMR), detectable Error Correction Codes (ECC), correctable ECC or parity generation.

13. The apparatus according to claim 11, wherein the encoder comprises a sort module configured to reorder the input data bits assigned to at least one of the plurality of classes.

14. The apparatus according to claim 11, wherein the encoder comprises an inverter configured to selectively invert the input data bits assigned to at least one of the plurality of classes.

15. A system comprising an apparatus according to claim 11, and a device, wherein the device is configured to provide at least one of a plurality of control signals to the apparatus and to receive an alarm signal.

16. The system according to claim 15, wherein at least one of a plurality of control signals defines self-test phases which determine the selective inversion of input data bits and/or the selective inversion of first redundancy bits (R').

17. A system comprising a plurality of apparatus according to claim 11, and a device, wherein the device is configured to receive a reduced alarm signal and the reduced alarm signal is configured to indicate correctable errors and uncorrectable errors.

* * * * *